Dec. 26, 1961  R. L. HARDWAY  3,014,719
MODEL AIRPLANE CONTROL UNIT
Filed Dec. 29, 1959  2 Sheets-Sheet 1

Roy L. Hardway
INVENTOR.

BY Clarence A. O'Brien
and Harvey B. Jacobson
Attorneys

Dec. 26, 1961  R. L. HARDWAY  3,014,719
MODEL AIRPLANE CONTROL UNIT
Filed Dec. 29, 1959  2 Sheets-Sheet 2

Roy L. Hardway
INVENTOR.

BY *Clarence A. O'Brien*
*and Harvey B. Jacobson*
Attorneys

United States Patent Office 3,014,719
Patented Dec. 26, 1961

3,014,719
MODEL AIRPLANE CONTROL UNIT
Roy L. Hardway, 6125 N. 35th Drive, Phoenix, Ariz.
Filed Dec. 29, 1959, Ser. No. 862,509
7 Claims. (Cl. 272—31)

This invention relates to model airplane control assemblies and more particularly to a model airplane control assembly which makes it possible to control the airplane from the exterior of the circle of flight.

An object of the invention is to provide a control assembly making it possible to operate from the exterior of the perimeter of flight and achieve the following salient advantages: maintain the two control lines of a conventional U control system untwisted and untangled; take up slack in the control lines, especially when the airplane is hit by a wind gust or the engine in the model airplane stops.

Briefly, the invention is embodied in an assembly operated from a stake which is stationarily mounted, for instance by driving it into the ground. A system of control line guidance is incorporated with the stake. The guidance is such that one line, arbitrarily considered the first control line, is guided in a straight-through path as it is handled by the assembly on the stake. The second control line is operatively connected with the airplane by way of a spring mechanism enabling the line to rotate without tangling. More particularly, the second control line is made in two sections, one of which is joined to the handle held in the hand by the airplane operator and the second section is made to rotate with reference to the first section, but it is coupled therewith insofar as deflection movements are concerned.

A further object of the invention is to provide an exceedingly simple model airplane control assembly which may be manufactured at a very low unit cost and which is practical to use. It is uncomplicated and has only a few moving parts. A very important advantage is that the U control handle is conventional and unaltered in construction and local method of use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
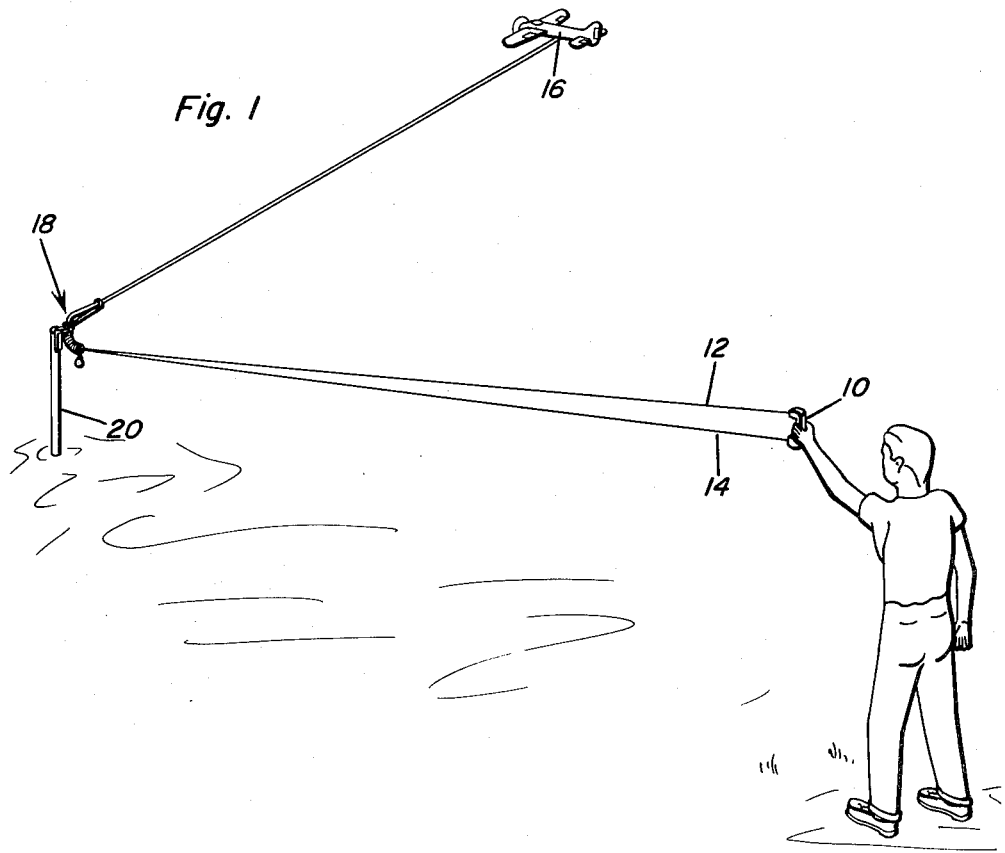
FIGURE 1 is a perspective view showing the control assembly in operation.

In the accompanying drawings FIGURE 1 shows a conventional U control handle 10 with a first line 12 and a second line 14 extending therefrom. These control lines ultimately exert control functions on the model airplane 16 in the conventional manner.

Control assembly 18 is at the center of the flight perimeter or circle, and the model airplane operator is removed from the circle of flight. Ordinarily control lines 12 and 14 would extend from handle 10 directly to the airplane 16. However, assembly 18 is interposed in the lines 12 and 14 between handle 10 and airplane 16, and assembly 18 is staked to the ground.

Assembly 18 is made of a post or stake 20 which is anchored, for instance by driving the stake into the ground. The stake may be made of any material, for instance it may be a wooden or metal stake. In either case bracket 22 is connected to the upper part of the stake by conventional fasteners or may be made a part of the stake. When attached in place to the stake, wood screws 24 may be used in those cases where the stake 20 is made of wood. The bracket 22 has an upper part 26 angled slightly upwardly from a horizontal plane, and it is provided with an aperture 28 intermediate the ends thereof.

Rotary bushing 30 is carried by the part 26 of the bracket and is disposed in opening 28. The rotary bushing is made of a first section 31 and a nut 32 on the first section. The first section may be made of ceramic, metal, glass, etc., and it has a cylindrical wall 34 extending through opening 28 and equipped with screw threads on which nut 32 is secured. The nut 32 forms one shoulder of the bushing, and there is a second shoulder 36 protruding laterally outwardly from wall 30, with the two shoulders fitting on the surfaces of bracket part 28.

First control line 12 is made of a single piece and extends from handle 10 to the airplane 16 by way of assembly 18. The control line 14 is made in two sections 38 and 41 with section 38 secured to handle 10. The first and second control lines will be discussed in more detail subsequently.

A coil spring 40 which is easily flexed and which is comparatively large in diameter, is secured at one end to the bushing 30 so that it is rotatable with the bushing. Any method of connection between one end of spring 40 and the bushing may be resorted to, for instance the end of the spring may be engaged in an opening in the nut 32. The opposite end of the spring 40 bears against disk 42 which is of a diameter similar to the diameter of the spring 40. The disk has a central opening 44 therein through which the first control line 12 freely passes. Section 41 of the second control line is secured, for instance by clamp 46 to the disk 42 between the center and periphery of the disk.

Arm 48 fits flush against one face of disk 42 and has a central opening 50 therein through which the first control line 12 passes. Second control line section 38 is secured in two places to the arm 48. Accordingly, the second control line section 38 is split and has two parts 51 and 52 secured by clamps 53 and 54 above and below opening 50. The lower end of arm 48 has a weight 56 thereon holding the arm in a vertical position but enabling disk 42 to rotate against one face thereof.

A bearing 60 is disposed in opening 50, and the bearing 60 is a conventional anti-friction bearing. Bushing 62 is disposed in the central opening of anti-friction bearing 60, and it has the first control line 12 passed therethrough so as to assure that the control line 12 will have complete freedom of motion with respect to arm 48 and disk 42.

Figure 2:
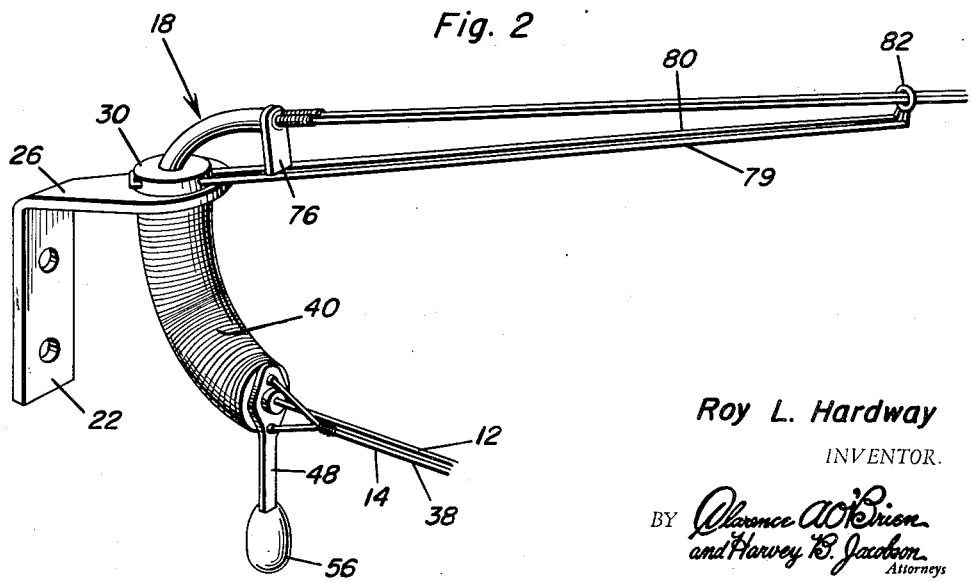
FIGURE 2 is a perspective view of the control assembly.
Figure 3:
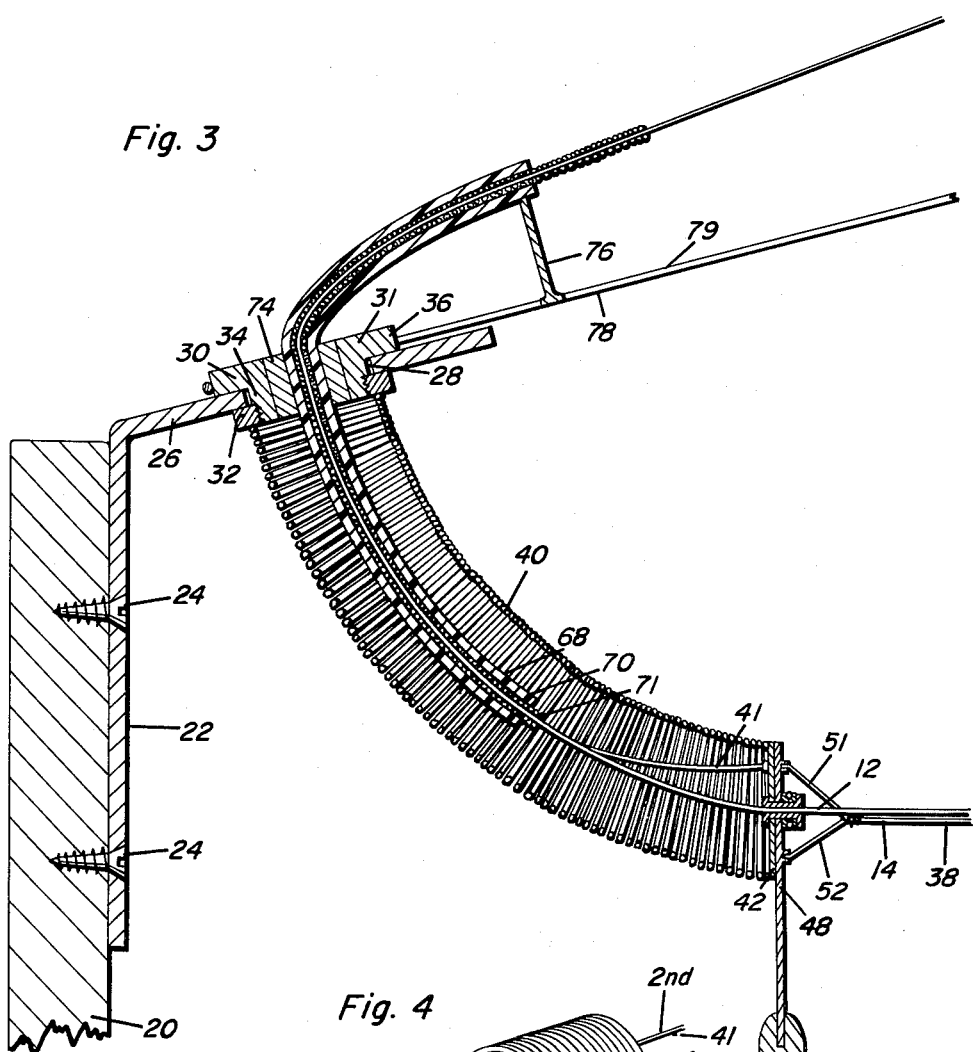
FIGURE 3 is a longitudinal sectional view of the assembly in FIGURE 2.
Figure 4:
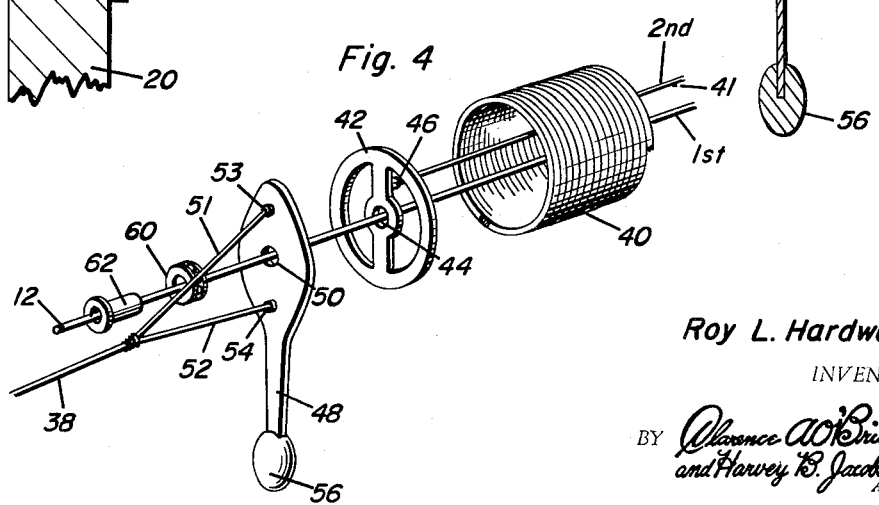
FIGURE 4 is an exploded perspective view of a portion of the control assembly.

Both control lines 12 and 41 are passed through a guide mechanism 68 disposed within the bore of spring 40. The guide mechanism 68 consists of a flexible plastic outer tube 70 and a coil spring 71 disposed in the bore of the flexible plastic tube. The tube and spring 70 and 71 respectively extend through a central insert 74 of bushing 30, and the ends thereof are supported by bracket 76. Line guide 78, quite similar to a fishing pole line guide and made of a pair of wires 79 and 80, is secured to the bushing 30. It has an eye 82 at the outer end thereof, and both wires 79 and 80 are disposed in passages (FIGURE 2) formed in the bushing 30. The support 76 is carried by the wires 79 and 80 at a place spaced slightly from bushing 30. As seen in FIGURE 2, there are two identical springs 71, one for each of the control lines i.e. control line 12 and section 41 of control line 14.

By inspecting FIGURES 1 and 2, the operation is deemed manifest. As the airplane 16 travels in its ordinary path of travel, for instance circular, the circular motion is transmitted to guide 78 by way of the lines 12 and 14. This causes bushing 30 to turn, and since spring 40 is secured to bushing 30, it also turns, but the turning movement is in the form of rotation. This rotary motion is imparted to disk 42 causing it to slide on the face of arm 48. Consequently, the rotational movement of section 41 of line 14 is not imparted to section 38 thereof, and section 38 thereof is the section which is secured to handle 10. Line 12 extends through disk 42 and arm 48 at the central axis, and therefore there is no component of movement which would cause twisting between lines 12 and 14.

When slack exists in the lines, it is necessary only for the user to pull handle 10 to take up the slack with the stored energy in spring 40 keeping the disk 42 and arm 48 pressed together. When control forces are desired, the lines 12 and 14 are manipulated in the usual way. Lengthening and shortening of line 12 is quite understandable in that it is a straight line connected between handle 10 and the airplane 16. Control forces exerted by line 14 are achieved by the action of weight 56 holding or at least tending to hold arm 48 vertical at all times. However, when the line 14 is moved in or out slightly, since the spring 40 keeps the arm 48 and disk 42 pressed together, paying in or out of section 38 will cause a corresponding movement to be achieved at section 41 which is ultimately connected with the airplane.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A model airplane control assembly to control the airplane from the outside of the perimeter of flight and wherein a conventional control handle and conventional airplane are used, said assembly comprising a coil spring, means rotationally supporting one end of said coil spring, control lines extending through said coil spring, one of said lines at the axis of rotation of said spring, the other of said lines including a pair of sections, and rotary means at the adjacent ends of said sections for allowing one of the sections to rotate with respect to the other of the sections, said rotary means including a disk at the opposite end of said spring and to which one of the sections is secured, and a laterally projecting, weighted, gravity controlled arm fitting flush against the face of said disk and to which the other of the sections is secured.

2. A model airplane control assembly to control the airplane from the outside of the perimeter of flight and wherein a conventional control handle and conventional airplane are used, said assembly comprising a coil spring, means rotationally supporting one end of said coil spring, control lines extending through said coil spring, one of said lines at the axis of rotation of said spring, the other of said lines including a pair of sections, and rotary means at the adjacent ends of said sections for allowing one of the sections to rotate with respect to the other of the sections, said rotary means including a disk at the opposite end of said spring and to which one of the sections is secured, an arm fitting flush against the face of said disk and projecting laterally therefrom and to which the other of the sections is secured, and a weight attached to the free end of said arm to hold said arm oriented in space.

3. A model airplane control assembly to control the airplane from the outside of the perimeter of flight and wherein a conventional control handle and conventional airplane are used, said assembly comprising a coil spring, means rotationally supporting one end of said coil spring, control lines extending through said coil spring, one of said lines at the axis of rotation of said spring, the other of said lines including a pair of sections, and rotary means at the adjacent ends of said sections for allowing one of the sections to rotate with respect to the other of the sections, said rotary means including a disk at the opposite end of said spring and to which one of the sections is secured, an arm fitting flush against the face of said disk and projecting laterally therefrom and to which the other of the sections is secured, and a weight attached to the free end of said arm to hold said arm oriented in space, said means mounting said spring for rotation including a bushing.

4. A model airplane control assembly to control the airplane from the outside of the perimeter of flight and wherein a conventional control handle and conventional airplane are used, said assembly comprising a coil spring, means rotationally supporting one end of said coil spring, control lines extending through said coil spring, one of said lines at the axis of rotation of said spring, the other of said lines including a pair of sections, rotary means at the adjacent ends of said sections for allowing one of the sections to rotate with respect to the other of the sections, said rotary means including a disk at the opposite end of said spring and to which one of the sections is secured, an arm fitting flush against the face of said disk and projecting laterally therefrom and to which the other of the sections is secured, a weight attached to the free end of said arm to hold said arm oriented in space, said means mounting said spring for rotation including a bushing, and guide means for said first section and said first line and at the axis of rotation of said bushing and through which said first section and said first line extend.

5. A model airplane control assembly to control the airplane from the outside of the perimeter of flight and wherein a conventional control handle and conventional airplane are used, said assembly comprising a coil spring, means rotationally supporting one end of said coil spring, control lines extending through said coil spring, one of said lines at the axis of rotation of said spring, the other of said lines including a pair of sections, rotary means at the adjacent ends of said sections for allowing one of the sections to rotate with respect to the other of the sections, said rotary means including a disk at the opposite end of said spring and to which one of the sections is secured, an arm fitting flush against the face of said disk and projecting laterally therefrom and to which the other of the sections is secured, a weight attached to the free end of said arm to hold said arm oriented in space, said means mounting said spring for rotation including a bushing, guide means for said first section and said first line and at the axis of rotation of said bushing and through which said first section and said first line extend, and a mechanical guide attached to said bushing and protruding laterally therefrom and supporting said guide means.

6. A model airplane control assembly to control the airplane from the outside of the perimeter of flight and wherein a conventional control handle and conventional airplane are used, said assembly comprising a coil spring, means rotationally supporting one end of said coil spring, control lines extending through said coil spring, one of said lines at the axis of rotation of said spring, the other of said lines including a pair of sections, rotary means at the adjacent ends of said sections for allowing one of the sections to rotate with respect to the other of the sections, said rotary means including a disk at the opposite end of said spring and to which one of the sections is secured, an arm fitting flush against the face of said disk and projecting laterally therefrom and to which the other of the sections is secured, a weight attached to the free end of said arm to hold said arm oriented in space, said means mounting said spring for rotation including a bushing, guide means for said first section and said first line and at the axis of rotation of said bushing and through which said first section and said first line extend, and a mechanical guide attached to said bushing and protruding laterally therefrom and supporting said guide means, said guide means comprising flexible elongate members.

7. A model airplane control assembly to control the airplane from the outside of the perimeter of flight and wherein a conventional control handle and conventional airplane are used, said assembly comprising a coil spring, means rotationally supporting one end of said coil spring, control lines extending through said coil spring, one of said lines at the axis of rotation of said spring, the other of said lines including a pair of sections, rotary means at the adjacent ends of said sections for allowing one of the sections to rotate with respect to the other of the sections, said rotary means including a disk at the opposite end of said spring and to which one of the sections is secured, an arm fitting flush against the face of said disk and projecting laterally therefrom and to which the other of the sections is secured, a weight attached to the free end of said arm to hold said arm oriented in space, said means mounting said spring for rotation including a bushing, guide means for said first section and said first line and at the axis of rotation of said bushing and through which said first section and said first line extend, and a mechanical guide attached to said bushing and protruding laterally therefrom and supporting said guide means, said guide means comprising flexible elongate members, said guide including at least one wire attached to said bushing and having an eye through which said lines extend, and said flexible elongate members mechanically coupled with said wire.

References Cited in the file of this patent

UNITED STATES PATENTS

| | | |
|---|---|---|
| 2,159,963 | Bonnanno | May 30, 1939 |
| 2,603,910 | Jones | July 22, 1952 |
| 2,907,569 | Taylor | Oct. 6, 1959 |